United States Patent
Hanzawa et al.

(10) Patent No.: US 11,645,136 B2
(45) Date of Patent: May 9, 2023

(54) CAPTURING REFERENCED INFORMATION IN A REPORT TO RESOLVE A COMPUTER PROBLEM

(71) Applicant: International Business Machines Corporation, Armonk, NY (US)

(72) Inventors: Junichi Hanzawa, Tokyo (JP); Tomomi Inoue, Tokyo (JP); Yuji Ohsuga, Kanagawa (JP); Hiromi Itoh, Mie-ken (JP)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/464,010

(22) Filed: Sep. 1, 2021

(65) Prior Publication Data

US 2023/0064638 A1    Mar. 2, 2023

(51) Int. Cl.
     *G06F 11/07*      (2006.01)
     *G06F 11/22*      (2006.01)

(52) U.S. Cl.
     CPC ........ *G06F 11/0769* (2013.01); *G06F 11/079* (2013.01); *G06F 11/0721* (2013.01); *G06F 11/0793* (2013.01); *G06F 11/2252* (2013.01)

(58) Field of Classification Search
     CPC ............. G06F 11/0769; G06F 11/0721; G06F 11/079; G06F 11/0793; G06F 11/2252
See application file for complete search history.

(56) References Cited

U.S. PATENT DOCUMENTS

| | | | |
|---|---|---|---|
| 9,537,736 B2 * | 1/2017 | Guo | H04L 43/06 |
| 10,650,086 B1 | 5/2020 | Knudson et al. | |
| 11,010,371 B1 * | 5/2021 | Slomka | G06F 3/04842 |
| 2012/0130968 A1 * | 5/2012 | Mule | G06F 16/434 707/706 |
| 2018/0060150 A1 * | 3/2018 | Cunico | G06F 3/013 |
| 2020/0004618 A1 * | 1/2020 | Thornhill | G06F 11/0769 |
| 2020/0320141 A1 | 10/2020 | Salvati | |
| 2021/0342209 A1 * | 11/2021 | Kishore | G06F 11/0769 |

(Continued)

OTHER PUBLICATIONS

"Eye tracking analysis"; Retrived from the internet on Aug. 6, 2021; www.mitsue.co.jp/service/ux/web_usability_testing/eye_tracking. html?form=MY01SV&OCID=MY01SV 6p.

(Continued)

*Primary Examiner* — Bryce P Bonzo
*Assistant Examiner* — Michael Xu
(74) *Attorney, Agent, or Firm* — Cantor Colburn LLP; Teddi Maranzano

(57) ABSTRACT

Embodiments relate to capturing referenced information in a report to resolve a computer problem. A report for a problem is determined to contain at least one referenced document, the report being generated based on at least one log. Relevant content is determined in the at least one referenced document based at least in part on hint information associated with the at least one referenced document and a term in the report. An enhanced report is generated for the problem of the computer equipment by inserting the relevant content into the report. A problem experienced by computer equipment is resolved by causing execution of at least one operation identified in the enhanced report.

17 Claims, 12 Drawing Sheets

(56) References Cited

U.S. PATENT DOCUMENTS

2021/0397499 A1\* 12/2021 Pronk ................ G06F 11/0733
2022/0066860 A1\* 3/2022 Sloane ................ G06F 11/0793

OTHER PUBLICATIONS

Mori, "A Scanning and Playback Tool for Analysis of Enormous User Operation Log"; SIG Technical Reports; Faculty of Engineering Science, Osaka University; Nov. 11, 1996. 8p. (English Abstract Only).

Muramatsu, "Time-series integration and utilization of code editing and web browsing history"; Information Processing Society of Japan Interaction 2019; IPSJ Interaction 2019; Mar. 6, 2019; 11p.

Ohsawa, "I desk : Information recall support tool based on user operation history"; Faculty of Environment and Information Studies, Keio University; 2006; 14p.

Seki, "Work history presentation method that encourages recall of work processes and results";Journal of the Japan Society for Educational Technology 40 (Suppl.), 113-116, 2016; 8p.

Sugita; "Using the browser operation log collection tool Web page browsing behavior analysis"; Information Processing Society of Japan Research Report; IPSJ SIG Technical Report;vol. 2011-DBS, 15p.

\* cited by examiner

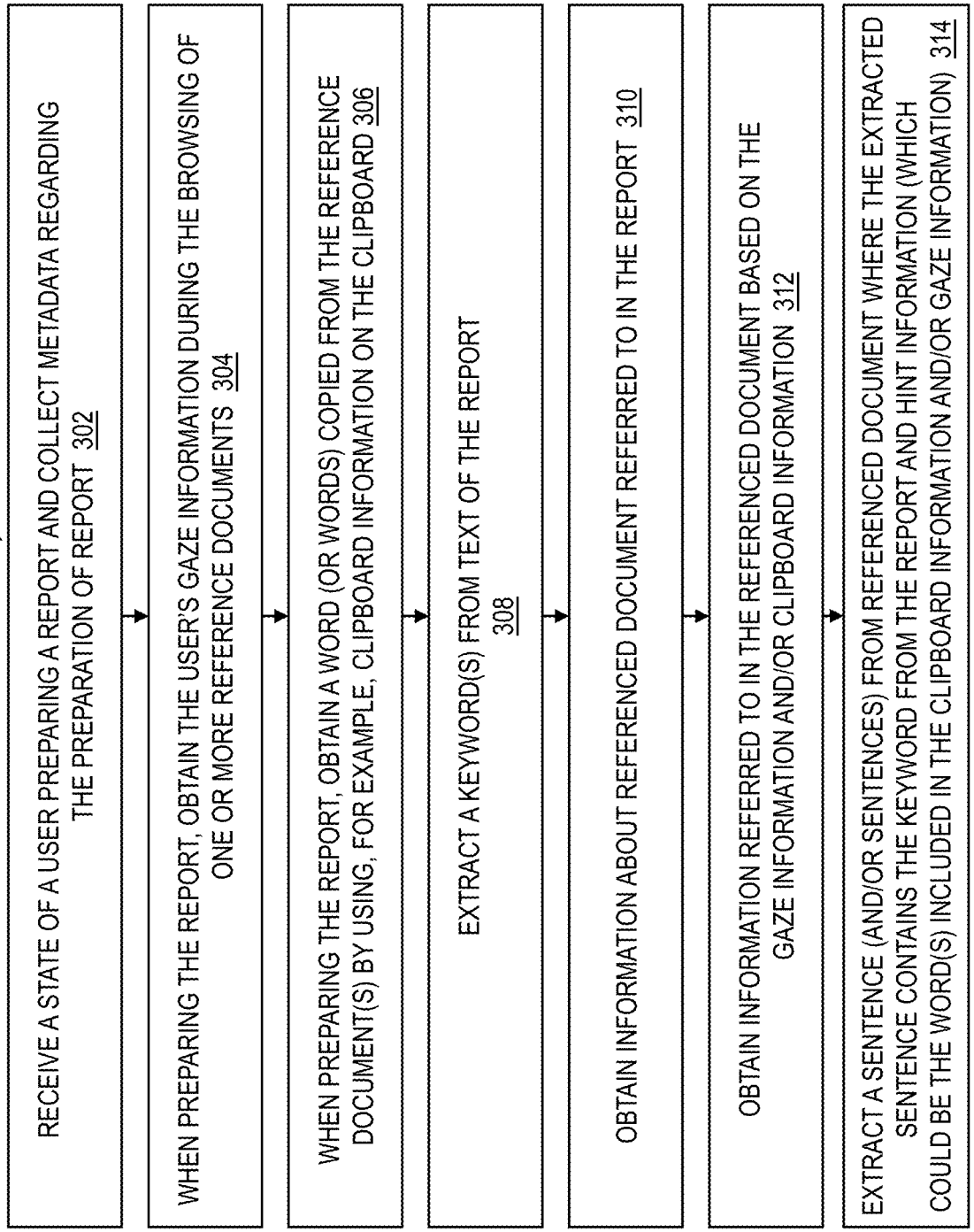

FIG. 3A 300

RECEIVE A STATE OF A USER PREPARING A REPORT AND COLLECT METADATA REGARDING THE PREPARATION OF REPORT 302

WHEN PREPARING THE REPORT, OBTAIN THE USER'S GAZE INFORMATION DURING THE BROWSING OF ONE OR MORE REFERENCE DOCUMENTS 304

WHEN PREPARING THE REPORT, OBTAIN A WORD (OR WORDS) COPIED FROM THE REFERENCE DOCUMENT(S) BY USING, FOR EXAMPLE, CLIPBOARD INFORMATION ON THE CLIPBOARD 306

EXTRACT A KEYWORD(S) FROM TEXT OF THE REPORT 308

OBTAIN INFORMATION ABOUT REFERENCED DOCUMENT REFERRED TO IN THE REPORT 310

OBTAIN INFORMATION REFERRED TO IN THE REFERENCED DOCUMENT BASED ON THE GAZE INFORMATION AND/OR CLIPBOARD INFORMATION 312

EXTRACT A SENTENCE (AND/OR SENTENCES) FROM REFERENCED DOCUMENT WHERE THE EXTRACTED SENTENCE CONTAINS THE KEYWORD FROM THE REPORT AND HINT INFORMATION (WHICH COULD BE THE WORD(S) INCLUDED IN THE CLIPBOARD INFORMATION AND/OR GAZE INFORMATION) 314

FIG. 6
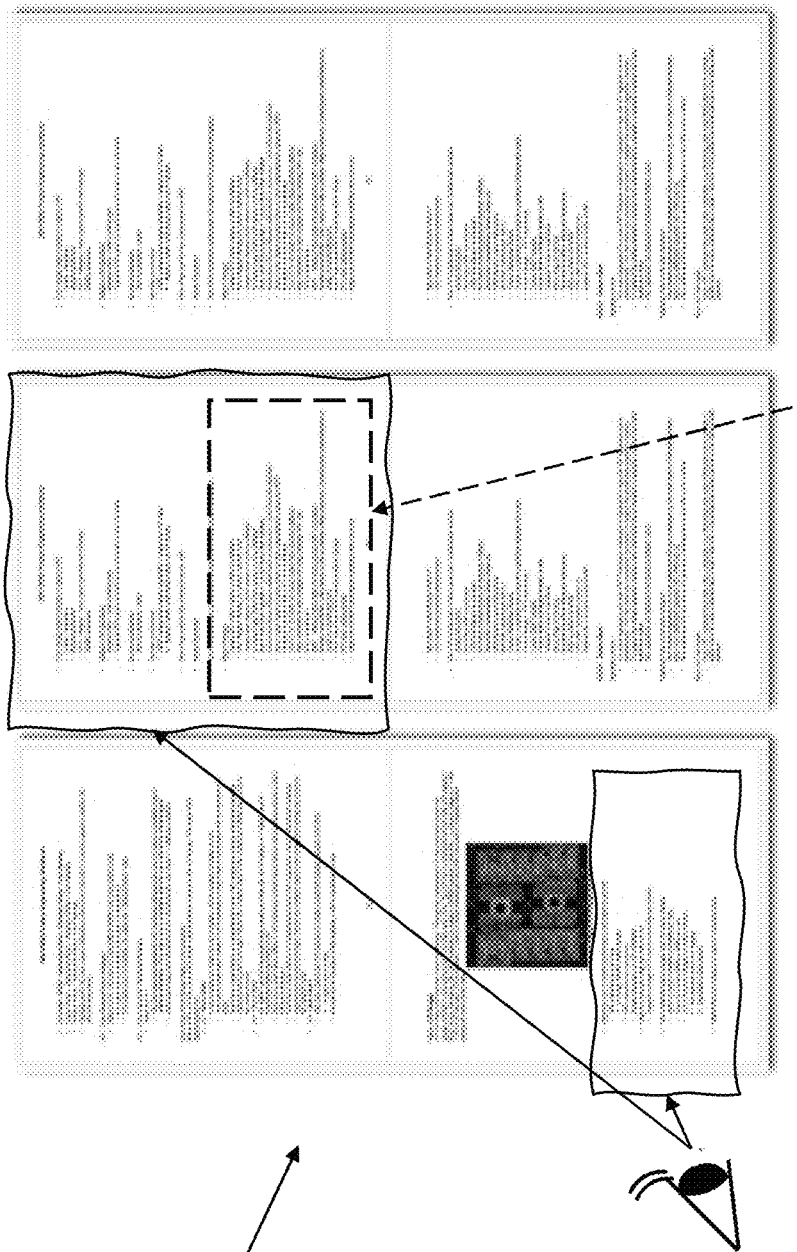
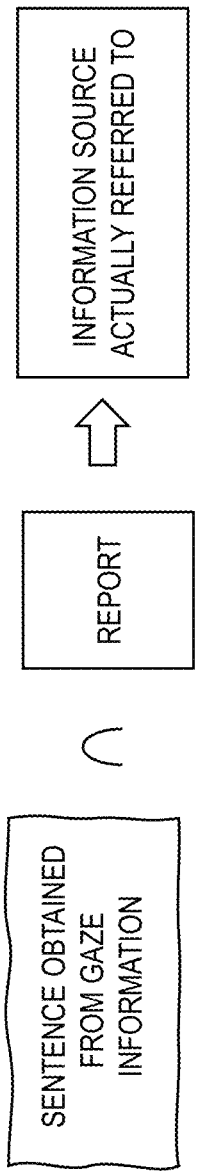

CAPTURING REFERENCED INFORMATION IN A REPORT TO RESOLVE A COMPUTER PROBLEM

BACKGROUND

The present invention generally relates to computer systems, and more specifically, to computer-implemented methods, computer systems, and computer program products configured and arranged for capturing referenced information in a report to resolve a computer problem.

Product engineering supports the service structure and serviceability of a product. They are typically called in to provide technical expertise for critical situations. Product engineering works with Development, Engineering Test, Reliability and Serviceability team and others early in the development cycle to learn the designs and implementation of systems/subsystems, and then acts as an interface to the field in resolving complex problems for customers. Product Engineering provides support to develop and drive the implementation of product repair, field management and problem resolution strategies. Responsibilities of this role include using a number of problem reporting tools. People in this role perform break-fix support, critical situation support, customer impact event repair action analysis and field engineering change support. To provide this support, Product Engineering is to be familiar with variety of corporate standards, product technical architectures, thousands of technical documentation and information on reporting tools, and processes.

SUMMARY

Embodiments of the present invention are directed to computer-implemented methods for capturing referenced information in a report to resolve a computer problem. A non-limiting example computer-implemented method includes determining that a report for a problem contains at least one referenced document, the report being generated based on at least one log. The computer-implemented method includes determining relevant content in the at least one referenced document based at least in part on hint information associated with the at least one referenced document and a term in the report. Also, the computer-implemented method includes generating an enhanced report for the problem by inserting the relevant content into the report and resolving the problem experienced by computer equipment by causing execution of at least one operation identified in the enhanced report.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of using gaze information to assist with determining and extracting information from a referenced document according to one or more embodiments of the present invention;

DETAILED DESCRIPTION

One or more embodiments of the present invention provide computer-implemented methods, computer systems, and computer program products arranged and configured for capturing referenced information in a report to resolve a computer problem. A log analyzer browses logs of a computer device to summarize why the problem happened and what kind of action plan should be implemented to resolve the computer problem. At that time, a link to referenced information and/or a source that is particularly regarded as important is often pasted in the report to indicate it is an information source. One or more embodiments provide a technique to obtain meaningful information related to a sentence referred to in the report where the sentence is from a referenced document used during report preparation. The report is enhanced with information from the referenced documents such that the enhanced report can be utilized to automatically resolve a computer problem for a computer system having a problem similar to the problem for which the original report was generated.

Software applications are configured to gather the report from and/or related to a first computer system, analyze the report to obtain referenced information for a document and/or link referenced in the report, and use additional information from the referenced document/link to enhance the report, thereby resulting in an enhanced report. When a product issue occurs (i.e., the same type of problem but with another/different computer system), one or more embodiments are configured to use the enhanced report to automatically initiate/start/perform resolution operations on the computer system, thereby fixing the root cause of the problem. Moreover, automatically performing operations to resolve the problem with the other computer system is a technical solution to a technical problem, which could not be performed in the human mind with or without the assistance of pen/paper. Further, using the enhanced report to determine the root cause of the problem and/or resolve the root cause of the problem (which could be a malicious computer attack or intrusion, a computer security threat, a serious malfunction of software/hardware, etc.) improves the functioning of a computer system itself as well as multiple computer systems interconnected in a cloud environment, thereby preventing further exposure to the root cause.

Figure 1:
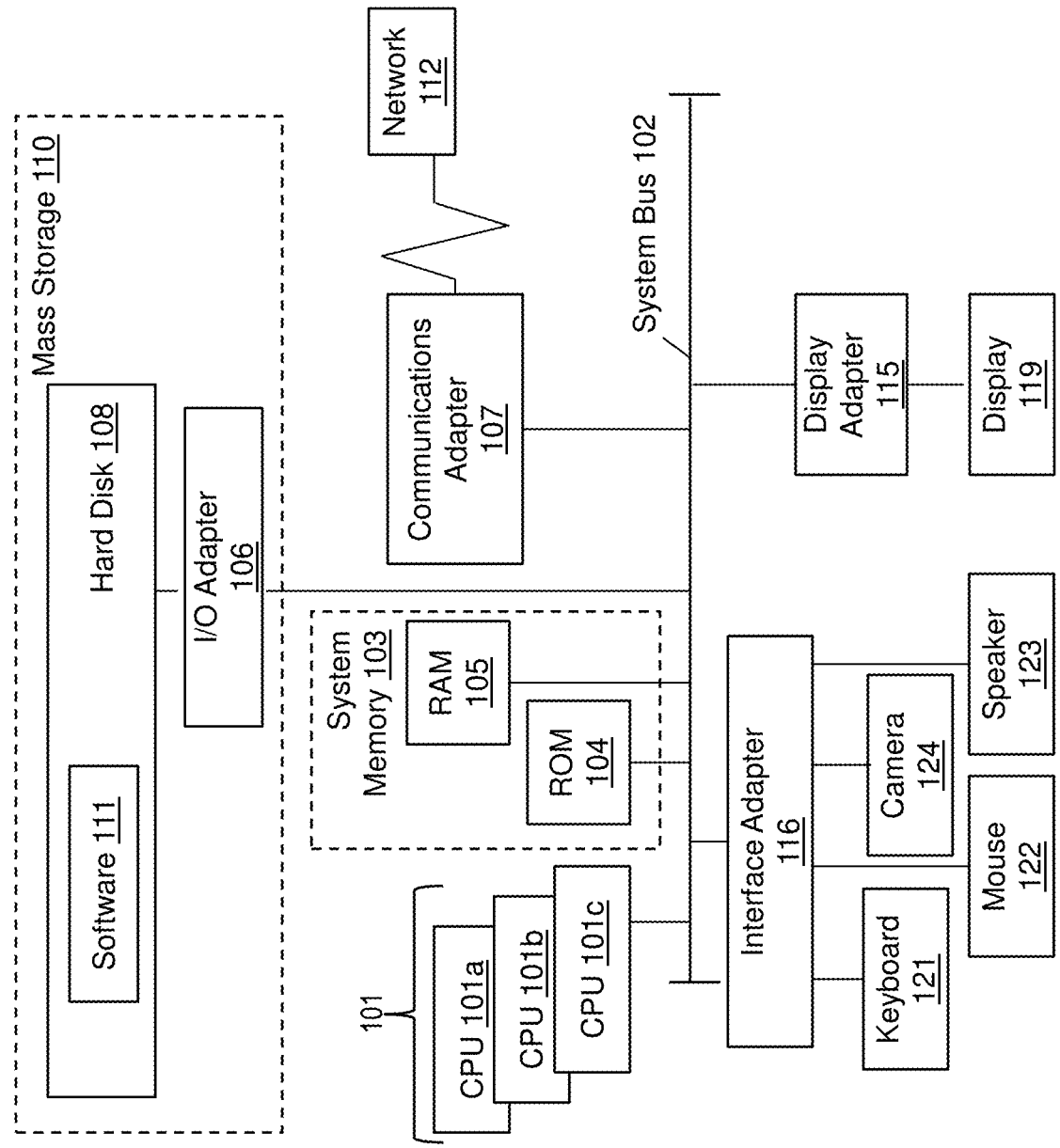
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a camera 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121, camera 124, and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
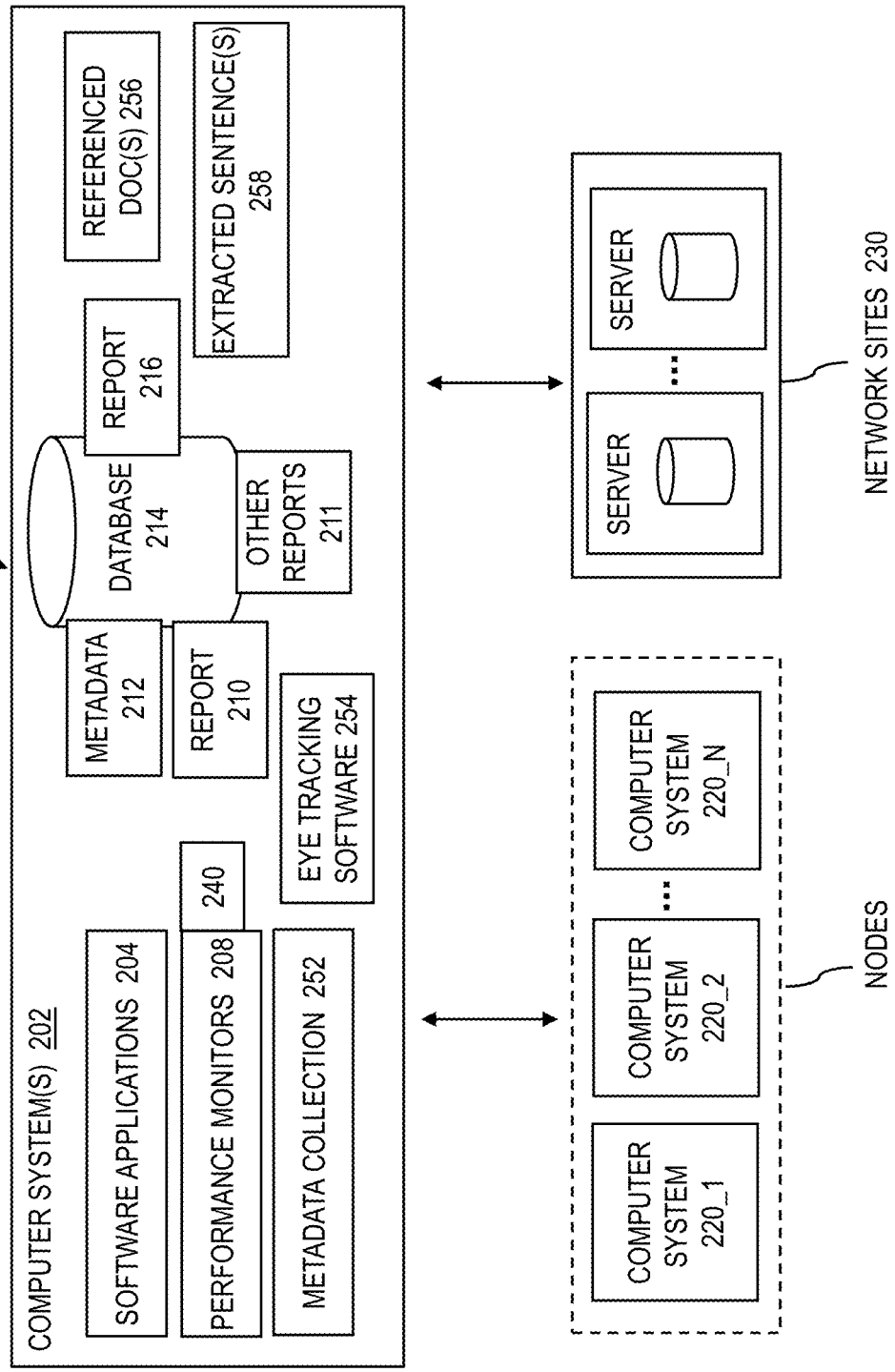
FIG. 2 is a block diagram of an example computing environment which is configured to capture referenced information in a report to resolve a computer problem in accordance with one or more embodiments of the present invention.

FIG. 2 is a block diagram of an example computing environment 200 which is configured to capture referenced information in a report to resolve a computer problem according to one or more embodiments of the inventions. Computing environment 200 can include computer system(s) 202 coupled to computer systems 220_1, 220_2, through 220_N and coupled to computer systems in network sites 230. Computer systems 220_1, 220_2, through 220_N can generally be referred to as computer systems 220. Also, computer systems 220_1, 220_2, through 220_N may be referred to as nodes. Computer systems 202 and 220 can include any of the hardware and software components and functionality discussed in computer system 100 of FIG. 1. Computer environment 200 may be representative of one or more portions of a cloud computing environment. Computer systems 220 are the hardware on which applications run and may include various servers, mainframes, etc. In one or more embodiments, computer system 202 may be representative of a single server or one or more servers. Computer system 202 includes one or more software applications 204 configured to capture referenced information in a report and cause a computer problem to be resolved on computer systems 220 in accordance with one or more embodiments. Moreover, software applications 204 are configured to perform/take/cause actions to resolve the root cause of the problem producing the computer problem which may be a performance issue on computer systems 220. Functions of system 200 can use and/or be implemented in workloads of workload layer 90 and any of the components of hardware and software layer 60 depicted in FIG. 12.

Computer system 202 can include one or more performance monitors 208, which are representative of various known monitoring tools, techniques, and functionality for a cloud environment as understood by one of ordinary skill in the art. Performance monitors 208 capture overall performance data of a cloud environment. Performance monitors 208 can be representative of performance monitors for each of computer systems 220 and various applications running on the computer systems 220.

Figure 3:
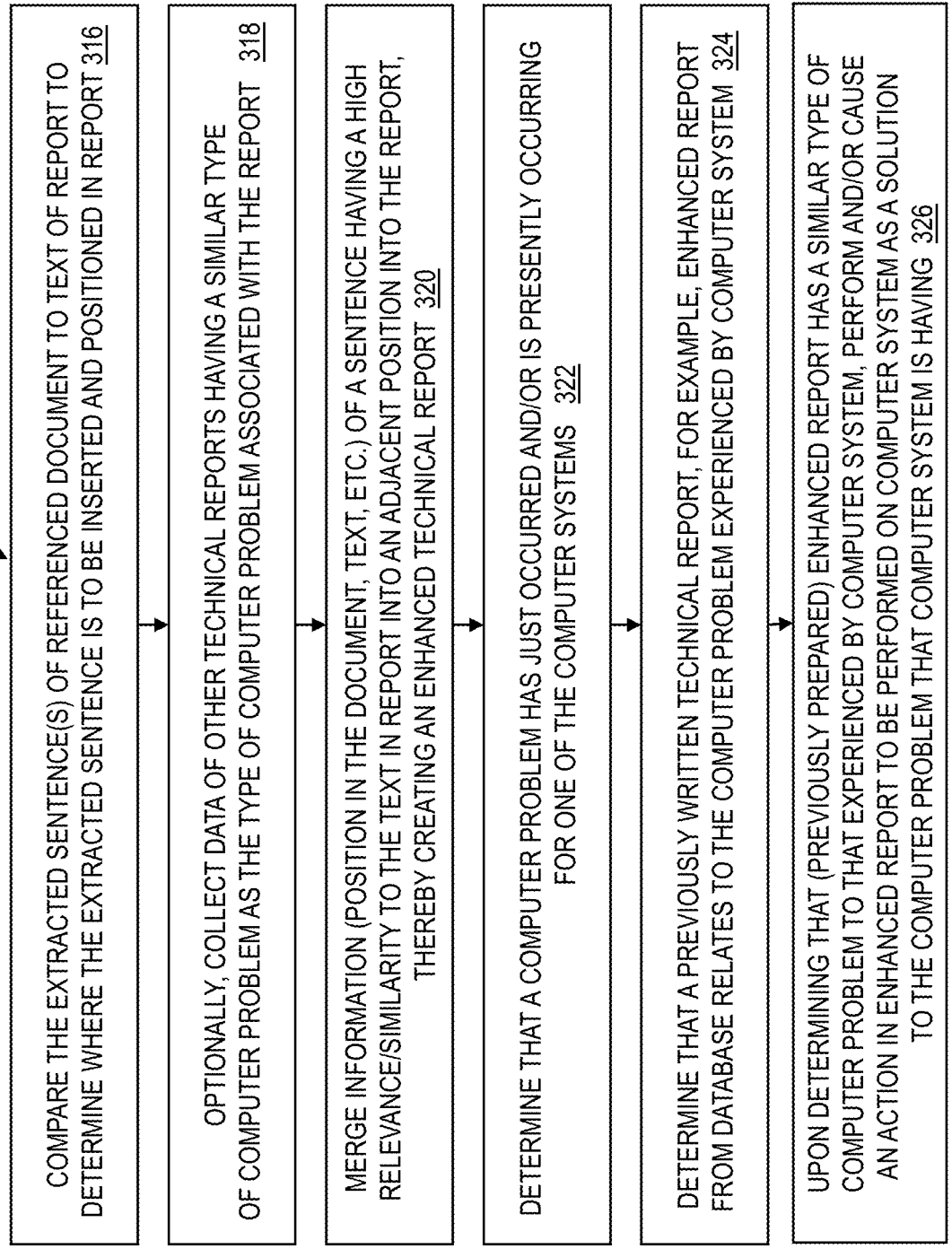
FIGS. 3A and 3B are a flowchart of a computer-implemented method for capturing referenced information in a report and using the enhanced report to resolve a computer problem according to one or more embodiments of the present invention.
Figure 4:
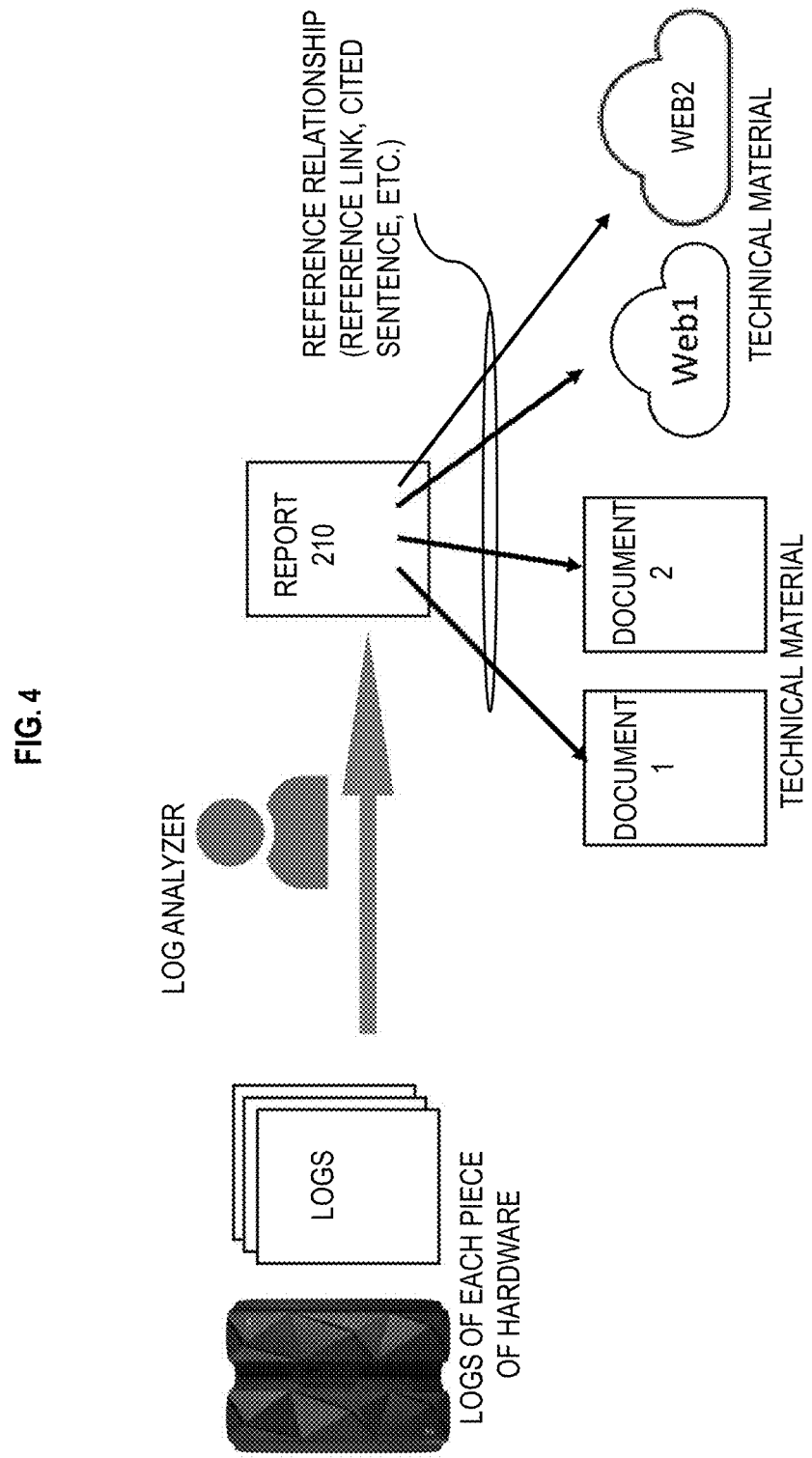
FIG. 4 depicts a block diagram of an example illustrating a log analyzer preparing a report, which may include references to technical material according to one or more embodiments of the present invention.

FIGS. 3A and 3B are a flowchart of a computer-implemented method 300 for capturing referenced information in a report and using the enhanced report to resolve a computer problem in accordance with one or more embodiments. At block 302 of the computer-implemented method, software application 204 is configured to receive a state of a user preparing a report 210 and collect metadata in a metadata file 212 regarding the preparation of report 210. Report 210 is associated with a particular type of computer problem, which could be a predefined computer problem. For example, report 210 can be based on logs from a computer system 220 and/or some other computer system. FIG. 4 depicts a block diagram of an example illustrating a log analyzer preparing report 210, which may include references to technical material. The technical material as referenced documents can be cited in report 210, can have links in report 210, referred to in report 210, etc. Various referenced documents can be on any computer system, such as, for example, computer systems of network sites 230. Referenced documents in network sites 230 are accessible by computer system 202. In one or more embodiments, software application 204 is configured to work in conjunction with metadata collection software 252 to capture action information of the user preparing report 210.

Referring to FIG. 3A, at block 304, when preparing report 210, software application 204 is configured to obtain the user's gaze information during the browsing of one or more reference documents. Software application 204 may utilize and/or call eye tracking software 254 to obtain the user's gaze information during the browsing of one or more referenced documents 256 when the user is preparing report 210. In one or more embodiments, camera 124 can be used to assist with eye tracking when the user is preparing report 210. Software application 204 is configured to store the user's gaze information as metadata in metadata file 212. Metadata file 212 is associated with report 210 and may contain a unique identifier of report 210. In one or more embodiments, metadata file 212 may be a table.

At block 306, when preparing report 210, software application 204 is configured to obtain a word (or words) copied from the referenced document(s) 256 by using, for example, clipboard information on the clipboard, which is a software tool for copying data. Software application 204 is configured to store the clipboard information as metadata in metadata file 212. Both the clipboard information and the gaze information are associated with report 210 in metadata file 212, and metadata file 212 is stored in database 214. The clipboard information and/or the gaze information are utilized as hint information discussed further herein.

At block 308, software application 204 is configured to extract a keyword from text of report 210. For example, software application 204 may extract a proper term such as a noun by conducting morphological analysis. Because the keyword is typically a technical term, software application 204 can determine the keyword. One or more embodiments can generate a dictionary that combines the term, such as a proper noun, with its importance by using a heuristic method in advance, and software application 204 can use the dictionary to extract the keyword. Also, to extract a keyword, software application 204 may use weighting and sorting out a group of extracted nouns to (1) set high importance for an important word (e.g., word related to parts), and (2) heuristically determine the weight of importance of a word for possible utilization. Software application 204 may use and/or employ other software that use topic analysis to determine the keyword in report 210.

At block 310, software application 204 is configured to obtain information about referenced document 256 referred to in report 210. For example, software application 204 may identify reference information (e.g., including web links, citations, titles, publication information, etc.) about referenced document 256 (a.) by using existing techniques understood by one of ordinary skill in the art, (b.) by using a relevant document registration system installed in a report registration system (e.g., in computer system 202 and/or another computer system), (c.) by obtaining document information by parsing referenced document 256, and/or (d.) by tracing uniform resource locator (URL) information in the URL format that refers to the referenced document 256. The document registration system can be used to manually and/or automatically register documents which include source of information to specify a root cause of a problem.

Figure 7:
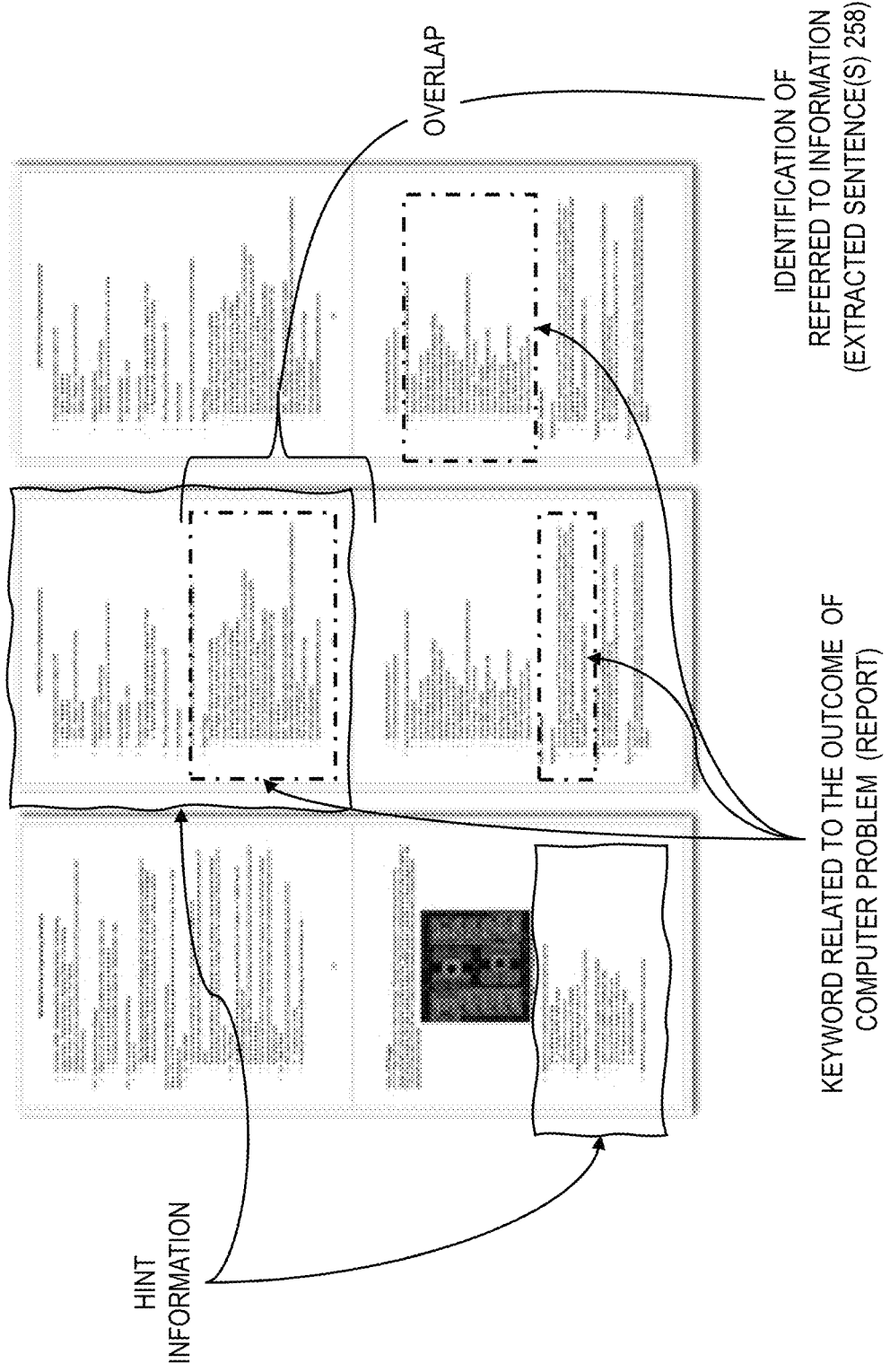
FIG. 7 depicts a block diagram as a display where gaze information and/or clipboard information is utilized as hint information in a referenced document and merged with keywords taken from the report according to one or more embodiments of the present invention.

At block 312, software application 204 is configured to obtain information referred to in the referenced document 256 based on the gaze information and/or clipboard information. For example, software application 204 may acquire information of a sentence (and/or sentences) referred to in referenced document 256 based on the gaze information and/or clipboard information stored in metadata file 212. The gaze information and/or clipboard information is designated as hint information as depicted in FIG. 7. Document 1 is utilized as the example referenced document 256 for explanation purposes in FIG. 7, and it should be appreciated that the description applies by analogy to other referenced documents.

At block 314, software application 204 is configured to extract a sentence (and/or sentences) 258 from referenced document 256, where the extracted sentence 258 contains (both) the keyword from report 210 (obtained at block 308) and hint information which could be the words/sentence(s) included in the clipboard information and/or gaze information at blocks 304, 306, 312. Extracted sentence 258 captures the overlap in the keyword from report 210 and the word/sentence hint information, as depicted in FIG. 7. In one or more embodiments, the extracted sentence 258 may contain a synonym of the keyword from report 210 instead of the keyword itself.

Referring to FIG. 3B, at block 316, software application 204 is configured to compare the extracted sentence(s) 258 of referenced document 256 to text of report 210 to determine where the extracted sentence 258 is to be inserted and positioned in report 210. In one example, to perform the comparison of the sentence information (i.e., extracted sentence 258) from referenced document 256 to the text and/or sentence in report 210, software application 204 may calculate a similarity between the sentence information (i.e., extracted sentence 258) from referenced document 256 to the text and/or sentence in report 210 using a standard technique (e.g. Cosine similarity, Doc2Vec, tf-idf (Term Frequency-Inverse Document Frequency, etc.) for comparing words/sentences to determine the degree of similarity between text, as known by one of ordinary skill in the art. Extracted sentence 258 is to be inserted in report 210 where the text and/or sentence in report 210 is determined to have a high similarity and/or the highest similarity to the extracted sentence 258. Also, extracted sentence 258 can be inserted in report 210 at the location where the referenced document 256 was referred to.

At block 318, optionally, software application 204 is configured to collect data of other technical reports 211 having a similar type of computer problem as the type of computer problem associated with report 210. Software application 204 searches and finds other reports 211 in database 214 having the same and/or similar type of computer problem as in report 210. Software application 204 is configured to search the other reports 211 using the sentence information (i.e., extracted sentence 258) to determine which ones of the other reports 211 have previously referred to and/or referenced the referenced document 256. The previously referenced information (position in the document, text, etc.) of a sentence that is related to the same kind information in the other report 211 should be effective as source of information. Hence, software application 204 is configured to add the previously referenced information into a list of information of the actually referenced sentence(s) as a highly importance reference. If these information is duplicated, the duplicated is disposed. When there is a new type of computer problem, this block is ignored.

Figure 8:
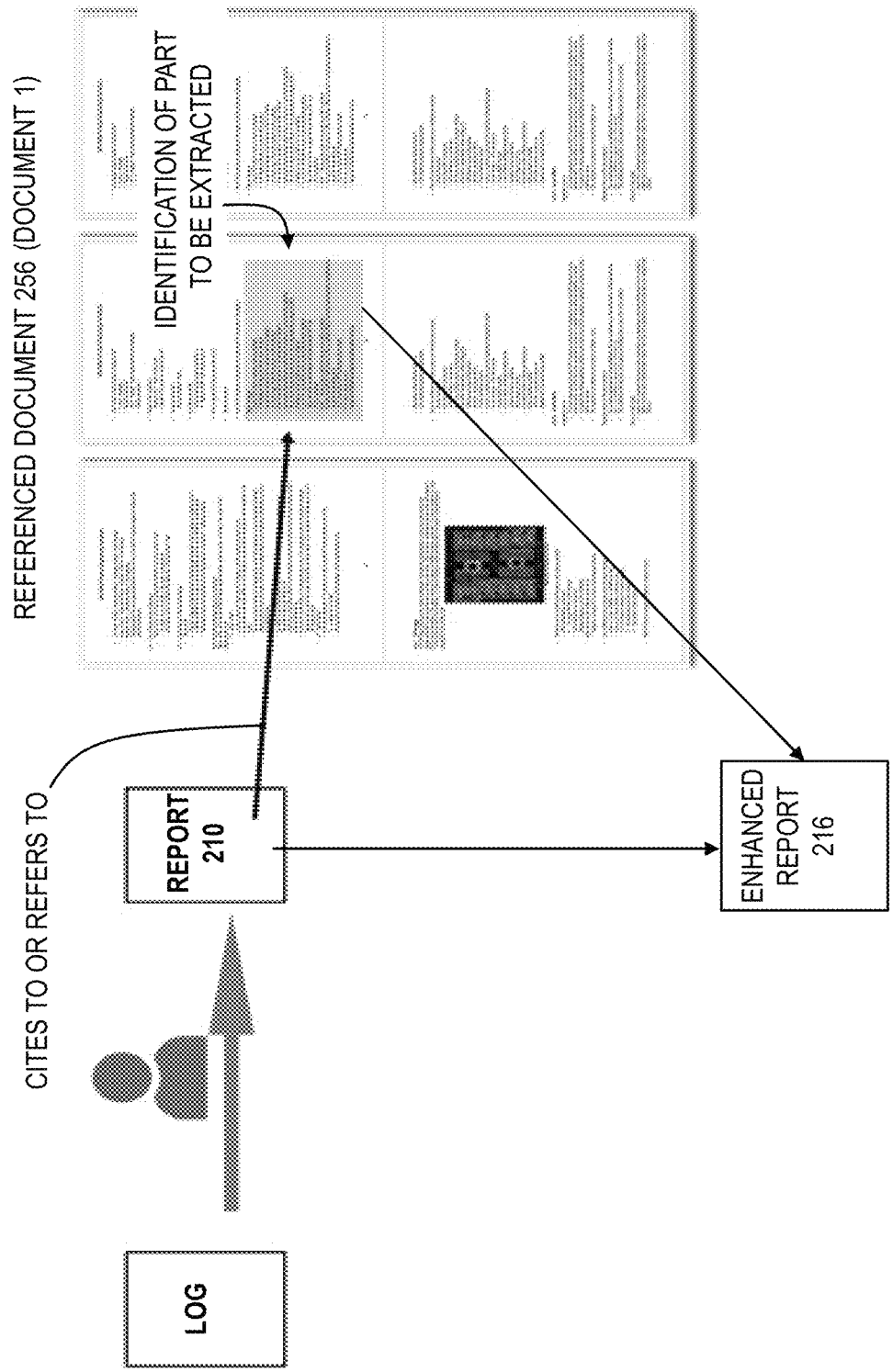
FIG. 8 depicts a block diagram of a graphical display of capturing the extracted sentence from the referenced document for insertion into an enhanced report according to one or more embodiments of the present invention.

At block 320, software application 204 is configured to merge information (position in the document, text, etc.) of a sentence having a high relevance/similarity to the text in report 210 into an adjacent position into report 210, thereby creating enhanced technical report 216. In one or more embodiments, extracted sentence 258 from referenced document 256 is merged and/or added into a position adjacent to similar text in report 210, thereby creating enhanced technical report 216 as depicted in FIG. 8. In one or more embodiments, extracted sentence 258 from referenced document 256 along with past information from a highly relevant/similar report in the other reports 211 can be merged and/or added into the position adjacent to similar text in report 210, thereby creating enhanced technical report 216; the past information from the highly ranked report in the other reports 211 is previously determined to be related to extracted sentence 258.

Referring to FIG. 3B, at block 322, software application 204 is configured to determine that a computer problem has just occurred and/or is presently occurring for one of the computer systems 220. In this example scenario, it is assumed for explanation purposes that computer system 220_1 had the computer problem and/or is having the computer problem, although the description applies by analogy to any of the computer systems 220. To determine the computer problem, software application 204 is configured to routinely check performance monitors 208 for a computer problem and/or receive an indication (e.g., a flag or trigger) from performance monitors 208 that there is a computer problem for computer system 220_1. Software application 204 can receive performance information 240 regarding the computer problem that is occurring and/or has occurred for computer system 220_1. Performance information 240 can include data from one or more logs for computer system 220_1.

At block 324, software application 204 is configured to determine that a previously written technical report, for example, enhanced report 216 from database 214 relates to the computer problem experienced by computer system 220_1. Software application 204 is configured to parse and analyze performance information 240 to determine that computer system 220_1 is having one or more types of computer problem. Software application 204 is configured to search database 214 to find enhanced report 216 having the same type of computer problem, where the reports in database 214 are registered and categorized by predefined topics. Existing tools can be utilized to determine the type of computer problem. Software application 204 (and/or another application) can determine various types of computer problems such as, for example, CPU problems, I/O problems, computing time and/cycle problems, memory problems, bandwidth problems, startup problem, and/or any other type of computer problems, by recognizing that one or more threshold in performance information have been met, using heuristics, using statistics, using performance models, and/or using existing techniques understood by one having ordinary skill in the art. Software application 204 may search database 214 for a report having a similar computer problem, to thereby find enhanced report 216.

At block 326, upon determining that (previously prepared) enhanced report 216 has a similar type of computer problem to that experienced by computer system 220_1, software application 204 is configured perform and/or cause an action/operation in enhanced report 216 to be performed on computer system 220_1 as a solution to the computer problem that computer system 220_1 is having. For example, software application 204 can search for and identify executable code as the action in enhanced report 216 to be automatically executed. Software application 204 is configured to perform the action and/or actions associated with the solution to the computer problem as instructed in the executable code in enhanced report 216, in order to thereby rectify the computer problem of computer system 220_1. In some cases, software application 204 can perform the action directly, and in some cases, software application 204 can cause another piece of software and/or hardware to perform the action. For any solution executed for computer system 220_1 (and other computer system 220), software application 204 is given access to any permissions, authentications, application program interfaces (APIs), scripts, etc., needed to execute the actions for the solution for the benefit of computer system 220_1. One or more actions performed by and/or caused to be performed by software application 204 may include blocking access to certain parts of memory/storage to prevent a potential security threat, preventing one or more applications and/or nodes from being utilized to process certain types of transactions, restarting a software application running on computer system 220_1, restarting computer system 220_1 itself, shutting down computer system 220_1, etc.

Figure 5:
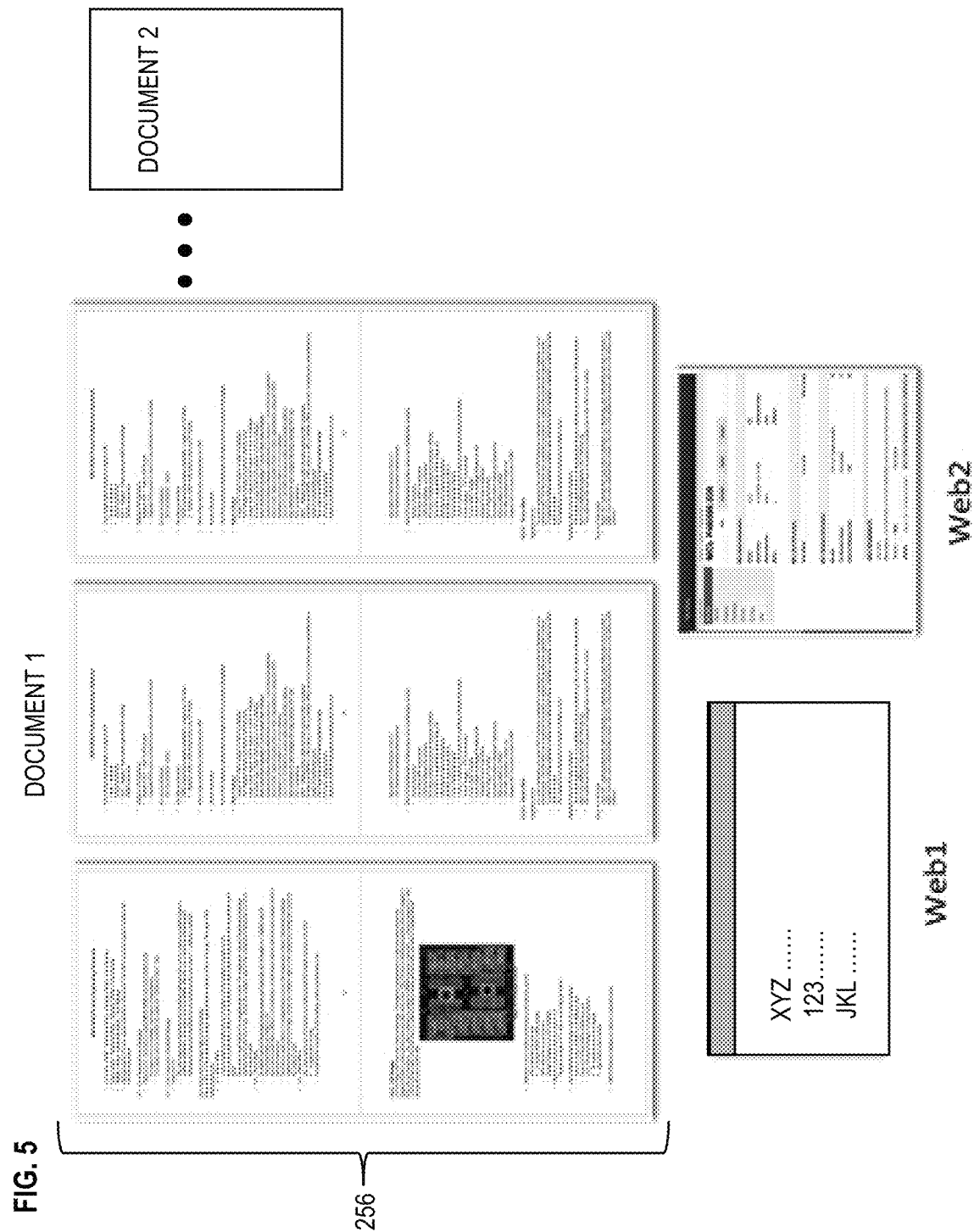
FIG. 5 depicts a block diagram of example referenced documents that may be referenced in a technical report according to one or more embodiments of the present invention.

FIG. 5 depicts a block diagram of example referenced documents (i.e., technical material) that may be referenced in a technical report 210 in accordance with one or more embodiments. As noted herein, the referenced documents can be papers, websites such as web1 and web2, etc. For explanation purposes, document 1 is taken as the example referenced document 256 that is utilized in further example scenarios.

FIG. 6 depicts a block diagram of using gaze information (which could also include clipboard information) to assist with determining and eventually extracting information (e.g., extracted sentence 258) from referenced document 256 (e.g., document 1) in accordance with one or more embodiments. As noted herein, report 210 can be prepared when a computer problem occurs to a computer system, and documents and web links be posted in report 210 may often include additional information different from the content of report 210. It is often difficult to determine what kind of additional information in the referenced document is beneficial.

Particularly, it may be difficult to point out the statement, paragraph, etc., in the referenced documents (e.g., referenced documents 256) by using only report 210 that includes references and web links, because of the lack of information of behavior information (i.e., metadata in metadata file 212) at the time the user created report 210. Accordingly, one or more embodiments have incorporated dynamic information (e.g., gaze information and text information from the clipboard) to identify the actual referenced portion of referenced document 256. It should be appreciated that the example referenced document 256 (e.g., document 1) contains more information that what is needed to indicate what is referred to in report 210. Accordingly, one or more embodiments utilize gaze information (and/or clipboard information) at the time of the log analyzer (i.e., user) browsing the referenced document 256. When preparing report 210, software application 204 (e.g., employing eye tracking software 254) is configured to capture gaze information, for example, as metadata associated with report 210. Example gaze information in referenced document 256 (e.g., document 1) is shown with a wavy line in FIG. 6. However, gaze information is not utilized alone because humans move the gaze of their eyes to information possibly without paying attention, and therefore, software application 204 may capture information that is not referred to in report 210. Accordingly, software application 204 is configured to further compare the sentence/paragraph extracted based on gaze information to text in report 210, as discussed in block 308, 310, 312 to obtain extracted sentence 258. For example, FIG. 7 depicts a block diagram as a display where the gaze information and/or clipboard information are utilized as hint information in referenced document 256 and where keywords are taken from report 210 in accordance with one or more embodiments. The keyword(s) from report 210 is utilized to search referenced document 256 for overlap with the hint information (e.g., gaze information and/or clipboard information), in order to result in the identification of extracted sentence(s) 258.

The hint information indicates what is potentially referred to in referenced document 256. The hint information can include gaze information which includes identified information guided from eye tracking information and/or information speculated from browsing time on a visible portion of the display screen as seen by the user. Gaze information does not necessarily need to be direct information and may be any information having an equivalent value to the gaze information. Gaze information can be based on the analysis of the locus of the gaze and/or gaze rate analysis.

Using eye tracking software 254, gaze information can be obtained by using the acquisition of data of a viewed part by synchronization of eye tracking data with the display screen of the user. Further, gaze information can be obtained by speculation of browsed information from browsing time per page (on the assumption that browsed information is provided as a set under a specific topic on each page of referenced document). Additionally, gaze information can be obtained using browsing action analysis as a method of identifying browsed information based on browser operation and user's action.

In FIG. 7, the hint information may include time series information of the clipboard that the user copied from referenced document 256 while preparing report 210, as captured by software application 204.

The hint information may include deposited information related to report 210. For example, software application 204 can search in database 214 and find other reports 211 having the same type of computer problem. For the other reports 211 having the same type of computer problem, software application 204 is configured to search the other reports 211 using referenced document 256 (e.g., document 1) to find information from referenced document 256 that has been similarly integrated into the other reports 211, and their integrated information can be utilized as hint information.

As can be seen in FIG. 7, software application 204 identifies and captures in referenced document 256 the intersection/overlap of the keyword(s) from report 210 and hint information (e.g., gaze information, clipboard information, etc.) to result in extracted sentence(s) 258 as discussed in blocks 312 and 314.

FIG. 8 depicts a block diagram of a graphical display of capturing the extracted sentence from the referenced document for insertion into enhanced report 216 in accordance with one or more embodiments. Information referred to in enhanced report 216 can be identified so that a source of information, for example, referenced document 256, can be identified quickly when (original) report 210 is needed to refer to a computer problem that happened in the past, thereby allowing computer system 220_1 having the same type of computer problem to be automatically resolved.

Additionally, a newly transferred employee can also determine the source of information in a browsed report 210. Although discussion hardware log analysis is used for explanation purposes, it should be appreciated that one or more embodiments are not limited to hardware analysis and resolution. One or more embodiments can be utilized for software analysis and resolution on computer systems. In addition to identifying referenced information in a referenced documents, one or more embodiments can provide automatic determination of any errors when a report involves a sentence indicating information different from referenced information; this contradiction can be determined by comparing referenced information in the referenced document to the sentence in the report.

Figure 9:
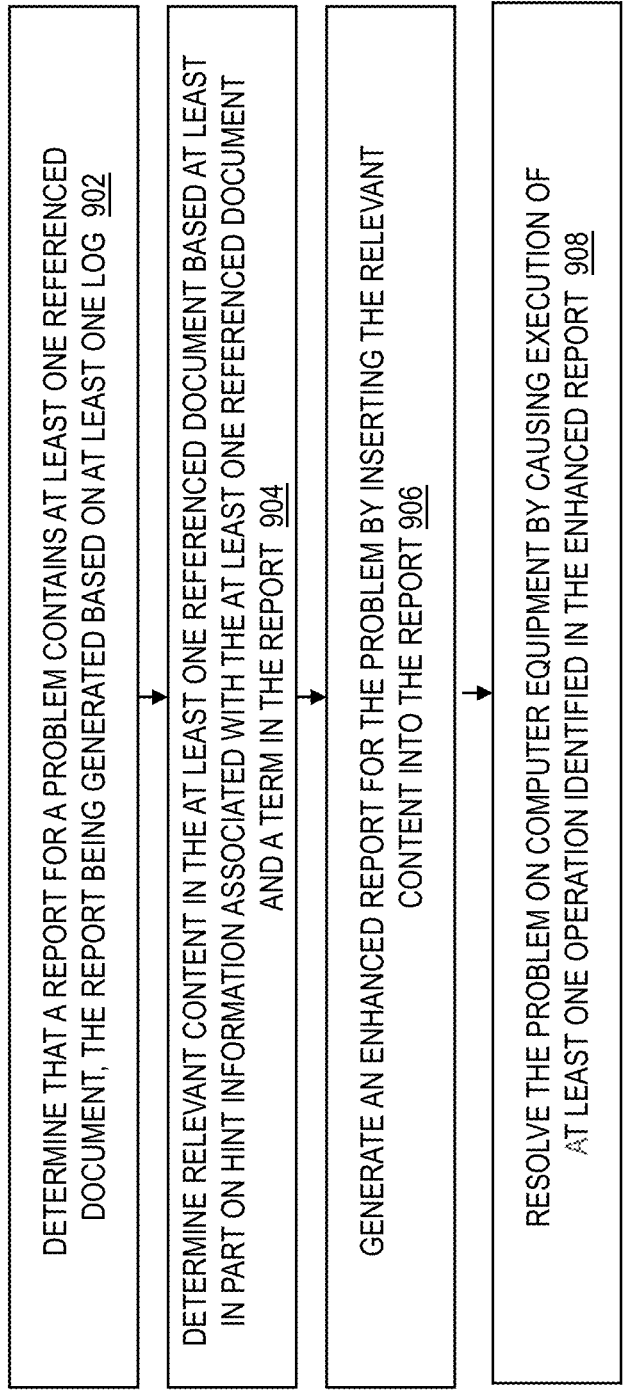
FIG. 9 is a flowchart of a computer-implemented method for capturing referenced information in a report to resolve a computer problem according to one or more embodiments of the present invention.

FIG. 9 is a flowchart of a computer-implemented method 900 for capturing referenced information in a report to resolve a computer problem in accordance with one or more embodiments of the invention. Computer-implemented method 900 may be performed using computer system 200 in FIG. 2. Functions of computer systems can use and/or implemented in hardware components of hardware and software layer 60 and/or workloads of workload layer 90 depicted in FIG. 12.

At block 902 of computer-implemented method 900, software application 204 of computer system 202 is configured to determine that a report 210 for a computer problem contains at least one referenced document 256, the report 210 being generated based on one or more logs of a given computer system (e.g., similar to one of computer systems 220).

At block 904, software application 204 is configured to determine relevant content (e.g., extracted sentence(s) 258) in the at least one referenced document based at least in part on hint information associated with the at least one referenced document 256 and a term in the report 210.

At block 906, software application 204 is configured to generate an enhanced report 216 for the computer problem by inserting the relevant content (e.g., extracted sentence(s) 258) into the (original) report 210.

At block 908, software application 204 is configured to resolve/solve the problem on computer equipment (e.g., computer system 220_1) by causing execution of at least one operation identified in the enhanced report 216. For example, the at least one operation affects computer system 220_1 to solve the computer problem on computer system 220_1. In one or more embodiments, software application 204 can cause one or more operations to be performed on computer system 220_1, for example, using API, using existing software applications on computer system 220_1. Software application 204 is configured to communicate with computer system 220_1 to cause one or more operations to be performed on computer system 220_1.

In one or more embodiments, the enhanced report 216 relates to a (same) type of problem experienced by the computer equipment (e.g., computer system 220_1). Determining the relevant content (e.g., extracted sentence(s) 258) in the at least one referenced document is based at least in part on gaze information associated with the at least one referenced document (e.g., referenced document 256). Determining the relevant content (e.g., extracted sentence(s) 258) in the at least one referenced document (e.g., referenced document 256) is based at least in part on clipboard information associated with the at least one referenced document. The relevant content (e.g., extracted sentence(s) 258) is copied from the at least one referenced document. The enhanced report 216 comprises the relevant content (e.g., extracted sentence(s) 258). The enhanced report 216 is graphically displayed with the relevant content inserted from the at least one referenced document (e.g., extracted sentence(s) 258). The at least one operation in the enhanced report 216 comprises a computer-executable solution to the problem of the computer equipment (e.g., computer system 220_1).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
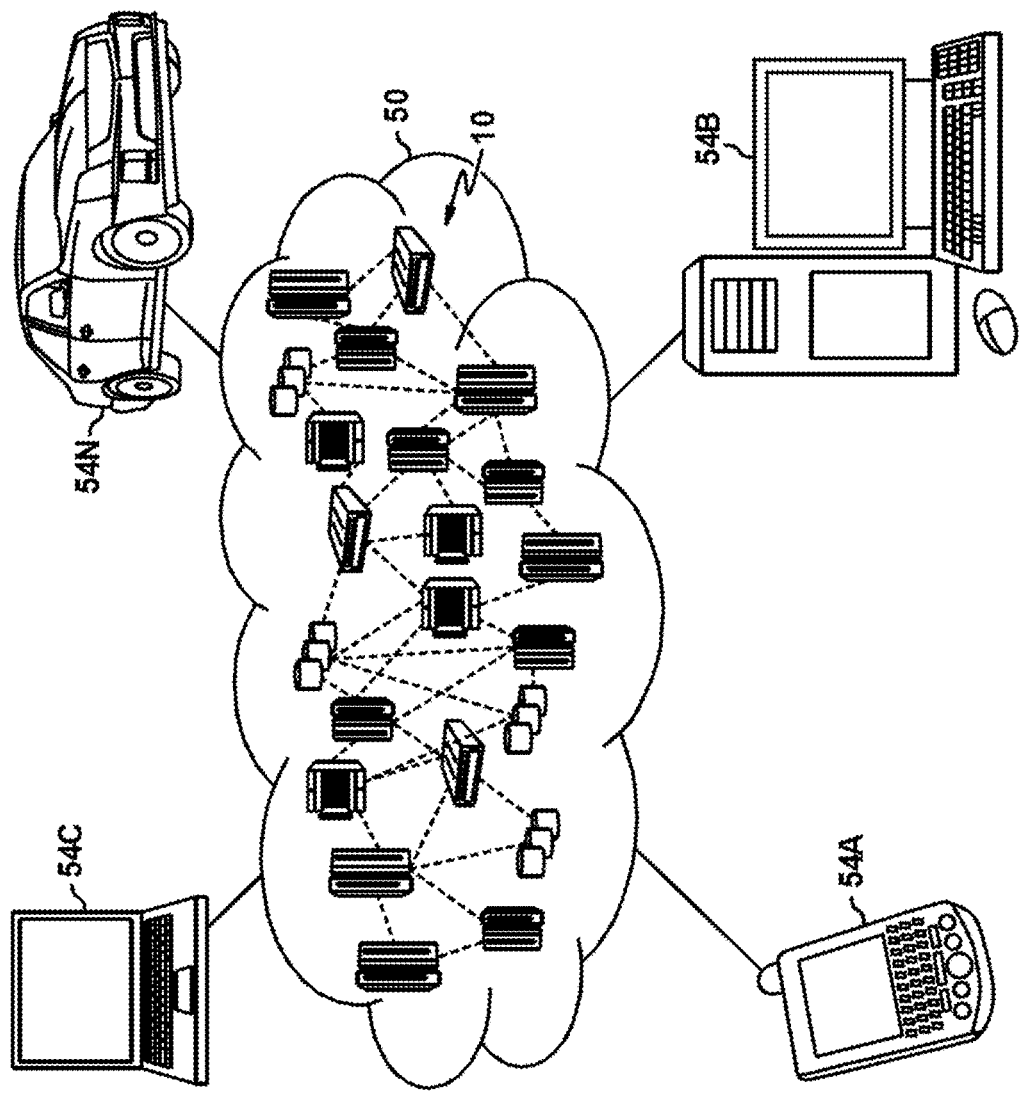
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
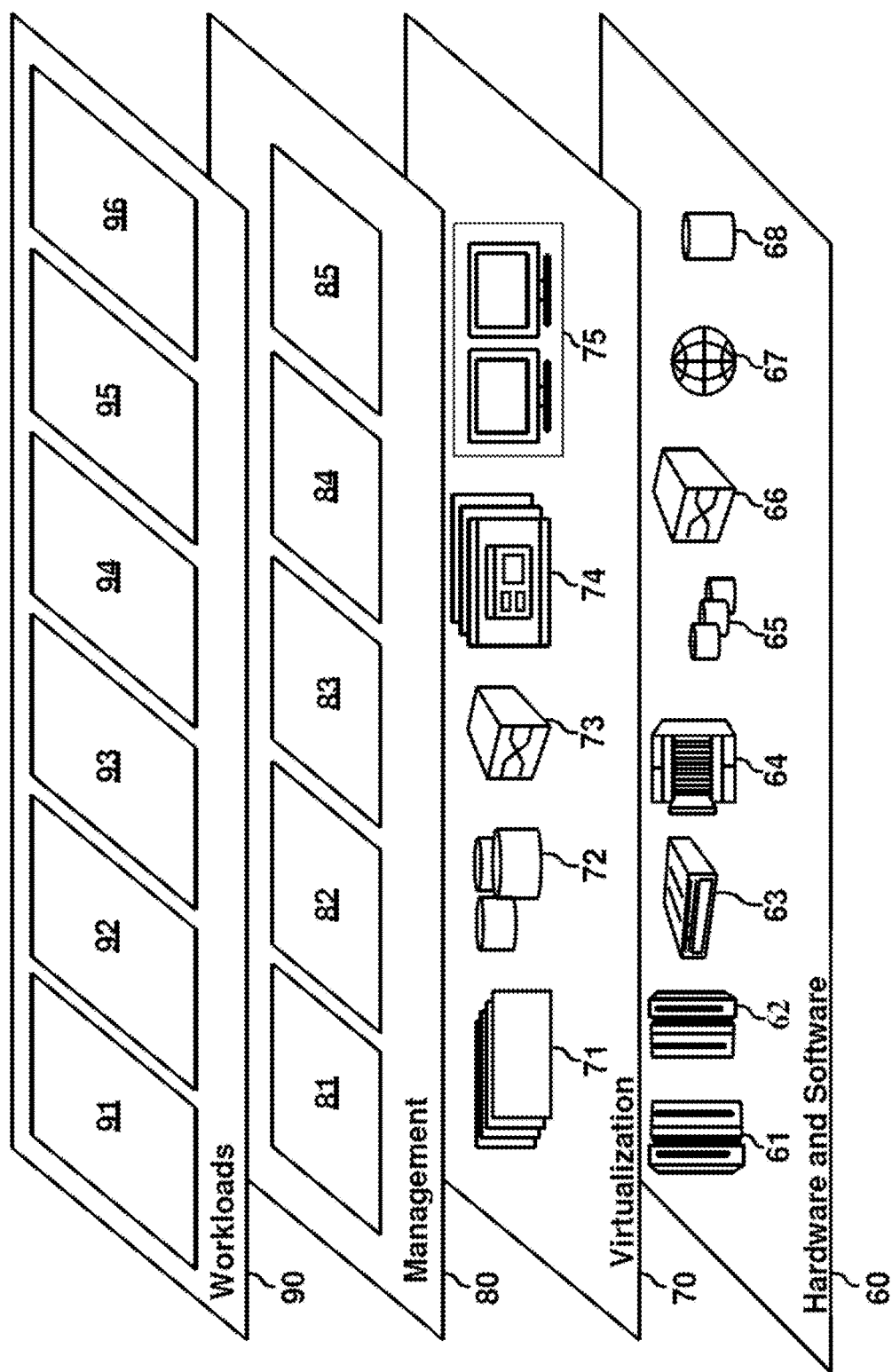
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include various software applications including software application 204, eye tracking software 254, etc., discussed herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining that a report for a problem contains at least one referenced document, the report being generated based on at least one log;
   determining relevant content in the at least one referenced document based at least in part on hint information associated with the at least one referenced document and a term in the report, wherein determining the relevant content in the at least one referenced document is based at least in part on clipboard information associated with the at least one referenced document;
   generating an enhanced report for the problem by inserting the relevant content into the report; and
   resolving the problem experienced by computer equipment by causing execution of at least one operation identified in the enhanced report.

2. The computer-implemented method of claim 1, wherein the enhanced report relates to a type of the problem experienced by the computer equipment.

3. The computer-implemented method of claim 1, wherein determining the relevant content in the at least one referenced document is based at least in part on gaze information associated with the at least one referenced document.

4. The computer-implemented method of claim 1, wherein the relevant content is copied from the at least one referenced document.

5. The computer-implemented method of claim 1, wherein the enhanced report comprises the relevant content.

6. The computer-implemented method of claim 1, wherein the at least one operation in the enhanced report comprises a computer-executable solution to the problem of the computer equipment.

7. A system comprising:
   a memory having computer readable instructions; and
   one or more processors for executing the computer readable instructions, the computer readable instructions controlling the one or more processors to perform operations comprising:
   determining that a report for a problem contains at least one referenced document, the report being generated based on at least one log;
   determining relevant content in the at least one referenced document based at least in part on hint information associated with the at least one referenced document and a term in the report, wherein determining the relevant content in the at least one referenced document is based at least in part on clipboard information associated with the at least one referenced document;

generating an enhanced report for the problem by inserting the relevant content into the report; and resolving the problem experienced by computer equipment by causing execution of at least one operation identified in the enhanced report.

8. The system of claim 7, wherein the enhanced report relates to a type of the problem experienced by the computer equipment.

9. The system of claim 7, wherein determining the relevant content in the at least one referenced document is based at least in part on gaze information associated with the at least one referenced document.

10. The system of claim 7, wherein the relevant content is copied from the at least one referenced document.

11. The system of claim 7, wherein the enhanced report comprises the relevant content.

12. The system of claim 7, wherein the at least one operation in the enhanced report comprises a computer-executable solution to the problem of the computer equipment.

13. A computer program product comprising a computer readable storage medium having program instructions embodied therewith, the program instructions executable by one or more processors to cause the one or more processors to perform operations comprising:

determining that a report for a problem contains at least one referenced document, the report being generated based on at least one log;

determining relevant content in the at least one referenced document based at least in part on hint information associated with the at least one referenced document and a term in the report, wherein determining the relevant content in the at least one referenced document is based at least in part on clipboard information associated with the at least one referenced document;

generating an enhanced report for the problem by inserting the relevant content into the report; and resolving the problem experienced by computer equipment by causing execution of at least one operation identified in the enhanced report.

14. The computer program product of claim 13, wherein the enhanced report relates to a type of the problem experienced by the computer equipment.

15. The computer program product of claim 13, wherein determining the relevant content in the at least one referenced document is based at least in part on gaze information associated with the at least one referenced document.

16. The computer program product of claim 13, wherein the relevant content is copied from the at least one referenced document.

17. The computer program product of claim 13, wherein the enhanced report comprises the relevant content.

* * * * *